(12) United States Patent
Spangler et al.

(10) Patent No.: US 10,443,707 B2
(45) Date of Patent: Oct. 15, 2019

(54) COOLING AND LUBRICATION SYSTEM INCLUDING 3-WAY SOLENOID-ACTUATED VALVE FOR AUTOMATIC TRANSMISSION

(71) Applicant: BorgWarner Inc., Auburn Hills, MI (US)

(72) Inventors: Christopher Spangler, Rochester Hills, MI (US); Jeffrey Waterstredt, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 239 days.

(21) Appl. No.: 15/468,735

(22) Filed: Mar. 24, 2017

(65) Prior Publication Data
US 2018/0274662 A1    Sep. 27, 2018

(51) Int. Cl.
*B60K 6/50* (2007.10)
*F16H 57/04* (2010.01)
(Continued)

(52) U.S. Cl.
CPC ......... *F16H 57/0476* (2013.01); *B60K 6/387* (2013.01); *B60K 6/50* (2013.01); *F16D 13/72* (2013.01); *F16D 13/74* (2013.01); *F16D 25/123* (2013.01); *F16H 57/0412* (2013.01); *F16H 57/0435* (2013.01); *F16H 57/0436* (2013.01);
(Continued)

(58) Field of Classification Search
CPC ............. F16H 57/0476; F16H 57/0473; F16H 57/0436; F16H 57/0435; F16H 57/0412; F16D 13/72; F16D 25/123; F16D 13/74; B60K 6/50; B60K 6/387; B60Y 2400/70; B60Y 2400/426; B60Y 2400/4244; B60Y 2400/4187; B60Y 2400/406;
(Continued)

(56) References Cited

U.S. PATENT DOCUMENTS

| 8,375,816 B2 | 2/2013 | Braford, Jr. |
| 8,771,137 B2 * | 7/2014 | Bolenbaugh ............ F16D 48/06 477/5 |

(Continued)

FOREIGN PATENT DOCUMENTS

WO    WO 2012/152382 A1    11/2012

OTHER PUBLICATIONS

English language abstract and machine-assisted English translation for WO 2012/152382 extracted from espacenet.com database on Apr. 3, 2017, 42 pages.

*Primary Examiner* — David J Hlavka
(74) *Attorney, Agent, or Firm* — Howard & Howard Attorneys PLLC

(57) ABSTRACT

A system for use in an automatic transmission includes a 3-way solenoid-actuated valve includes a valve body having an inlet port and a first outlet port and a second outlet port, a valve disposed within the valve body and slidably controllable to proportion flow between the first outlet port and the second outlet port, and a spring disposed in the valve body to bias the valve for flow toward the second outlet port. The system also includes at least one pump providing fluid to the inlet port, a first fluid circuit connected to the first outlet port providing fluid to a first subsystem of the automatic transmission, and a second fluid circuit connected to the second outlet port providing fluid to a second subsystem of the automatic transmission.

16 Claims, 5 Drawing Sheets

(51) Int. Cl.
*B60K 6/387* (2007.10)
*F16D 13/72* (2006.01)
*F16D 13/74* (2006.01)
*F16D 25/12* (2006.01)

(52) U.S. Cl.
CPC ...... *F16H 57/0473* (2013.01); *B60Y 2200/92* (2013.01); *B60Y 2306/03* (2013.01); *B60Y 2306/05* (2013.01); *B60Y 2400/406* (2013.01); *B60Y 2400/4187* (2013.01); *B60Y 2400/426* (2013.01); *B60Y 2400/4244* (2013.01); *B60Y 2400/70* (2013.01); *Y10S 903/914* (2013.01); *Y10S 903/915* (2013.01)

(58) Field of Classification Search
CPC ............ B60Y 2306/05; B60Y 2306/03; B60Y 2200/92; Y10S 903/915; Y10S 903/914
See application file for complete search history.

(56) References Cited

U.S. PATENT DOCUMENTS

| | | | |
|---|---|---|---|
| 10,161,422 B2* | 12/2018 | Guo | F15B 11/16 |
| 2006/0006042 A1* | 1/2006 | Koenig | F16D 13/72 |
| | | | 192/113.3 |
| 2006/0054442 A1* | 3/2006 | Hegerath | F16D 25/10 |
| | | | 192/48.9 |
| 2014/0169994 A1* | 6/2014 | Schuller | F16D 25/123 |
| | | | 417/410.1 |
| 2016/0032986 A1* | 2/2016 | Pritchard | B60K 23/0808 |
| | | | 192/85.61 |
| 2017/0306988 A1* | 10/2017 | Guo | F16H 61/0021 |

* cited by examiner

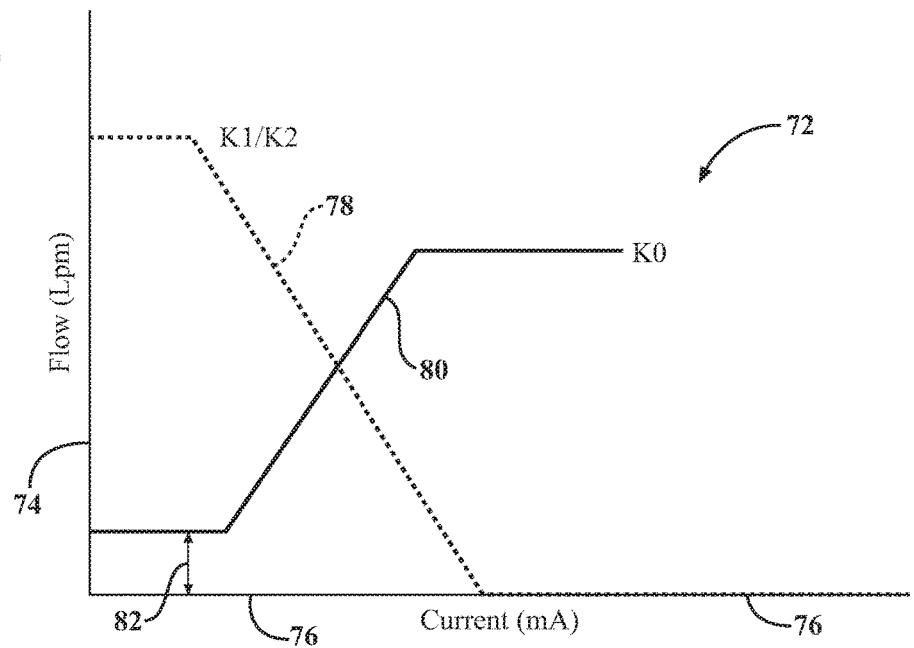
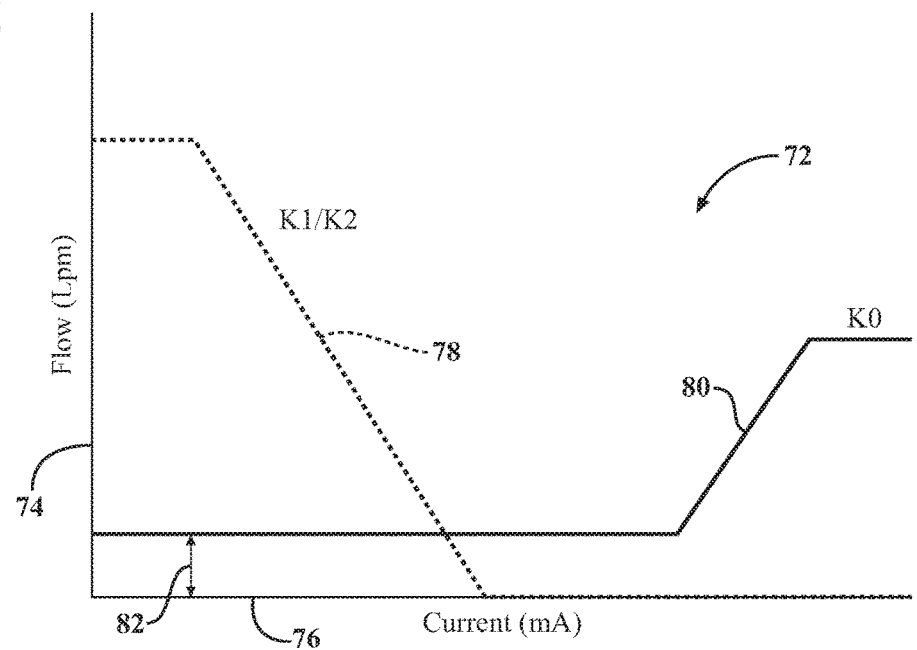

COOLING AND LUBRICATION SYSTEM INCLUDING 3-WAY SOLENOID-ACTUATED VALVE FOR AUTOMATIC TRANSMISSION

BACKGROUND OF INVENTION

1. Field of Invention

The present invention relates generally to cooling and lubrication systems for automatic transmissions and, more specifically, to a system including a 3-way solenoid-actuated valve for an automatic transmission.

2. Description of the Related Art

Conventional vehicles known in the art typically include an engine having a rotational output that provides a rotational input into a transmission such as an automatic transmission for a powertrain system of the vehicle. The transmission changes the rotational speed and torque generated by an output of the engine through a series of predetermined gearsets to transmit power to one or more wheels of the vehicle, whereby changing between the gearsets enables the vehicle to travel at different vehicle speeds for a given engine speed.

In addition to changing between the gearsets, the automatic transmission is also used to modulate engagement with the engine, whereby the transmission can selectively control engagement with the engine so as to facilitate vehicle operation. By way of example, torque translation between the engine and the automatic transmission is typically interrupted while the vehicle is parked or idling, or when the transmission changes between the gearsets. In conventional automatic transmissions, modulation is achieved via a hydrodynamic device such as a hydraulic torque converter. However, modern automatic transmissions, such as dual clutch transmissions or parallel hybrid transmissions, may replace the torque converter with one or more electronically and/or hydraulically actuated clutches. Automatic transmissions are typically controlled using hydraulic fluid, and include a pump assembly, one or more hydraulic solenoid-actuated valves, and an electronic controller. The pump assembly provides a source of fluid power to the solenoid-actuated valves which, in turn, are actuated by the controller so as to selectively direct hydraulic fluid throughout the automatic transmission to control modulation of rotational torque generated by the output of the engine. The solenoid-actuated valves are also typically used to control hydraulic fluid for actuation of the clutches and synchronizers of the automatic transmission, and may also be used to control hydraulic fluid used to cool and/or lubricate various components of the transmission in operation.

In many cases, for the automatic transmission, a solenoid-actuated valve is provided for either cooling or lubrication of transmission subsystems such as clutches, electric motors, etc. Typically, one solenoid-actuated valve is provided for controlling cooling fluid flow in one direction to one or more transmission subsystems. The solenoid-actuated valve typically provides a controlled, variable amount of fluid flow to one or more transmission subsystems. Thus, there is a need in the art to provide a system including a single solenoid-actuated valve and a pump control that provides independent proportional control of flow to two different subsystems for use in an automatic transmission.

SUMMARY OF THE INVENTION

The present invention provides a system for use in an automatic transmission including a 3-way solenoid-actuated valve having a valve body with an inlet port and a first outlet port and a second outlet port, a valve disposed within the valve body and slidably controllable to proportion flow between the first outlet port and the second outlet port, and a spring disposed in the valve body to bias the valve for flow toward the second outlet port. The system also includes at least one pump providing fluid to the inlet port, a first fluid circuit connected to the first outlet port providing fluid to a first subsystem of the automatic transmission, and a second fluid circuit connected to the second outlet port providing fluid to a second subsystem of the automatic transmission.

One characteristic of the present invention is that a new system for an automatic transmission is provided that includes a 3-way solenoid-actuated valve. Another characteristic of the present invention is that the 3-way solenoid-actuated valve includes has an inlet port fed by a pump and two outlet ports connected to two different subsystems of the automatic transmission that require cooling/lubrication. The advantage of the present invention is that in this system, by controlling a current to the solenoid-actuated valve and the speed of an electric motor for a pump, a wide range of combinations of lube/cooling flow distribution can be controlled. Still another advantage of the present invention is that the system allows somewhat independent control of flow to two different subsystems of the automatic transmission through the control of the solenoid-actuated valve and electric motor speed.

Other objects, features, and advantages of the present invention will be readily appreciated as the same becomes better understood after reading the subsequent description taken in connection with the accompanying drawings.

BRIEF DESCRIPTION OF THE DRAWINGS

FIG. 4 is a graph of flow versus current for the cooling and lubrication system of FIG. 2.

FIG. 5 is another graph of flow versus current for the cooling and lubrication system of FIG. 2.

DETAILED DESCRIPTION OF THE INVENTION

Figure 1:
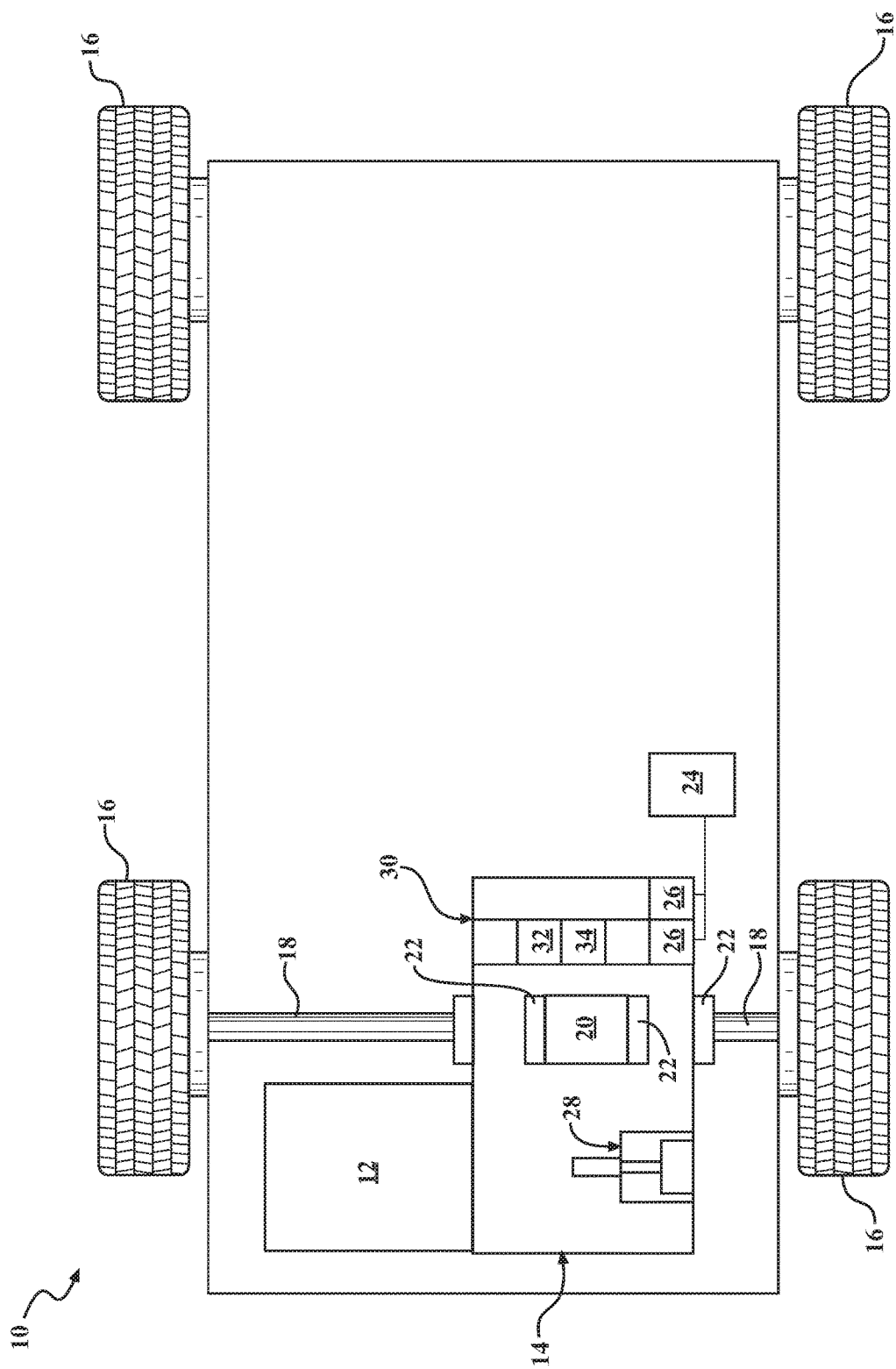
FIG. 1 is a schematic view of a vehicle with a powertrain system including a cooling and lubrication system, according to the present invention.

Referring now to the figures, where like numerals are used to designate like structure unless otherwise indicated, a vehicle powertrain system is schematically illustrated at 10 in FIG. 1. The powertrain system 10 includes an engine 12 in rotational communication with an automatic transmission 14. The engine 12 generates rotational torque which is selectively translated to the automatic transmission 14 which, in turn, translates rotational torque to one or more wheels, generally indicated at 16. To that end, a pair of axles 18 translates rotational torque from the automatic transmission 14 to the wheels 16. It should be appreciated that the engine 12 and the automatic transmission 14 of FIG. 1 are of the type employed in a conventional "transverse front wheel drive" powertrain system 10. It should also be appreciated that the engine 12 and/or automatic transmission 14 could be configured in any suitable way sufficient to generate and translate rotational torque so as to drive the vehicle, without departing from the scope of the present invention.

The automatic transmission 14 multiplies the rotational speed and torque generated by the engine 12 through a series of predetermined gearsets 20 (not shown in detail, but generally known in the art), whereby changing between the gearsets 20 enables the vehicle to travel at different vehicle speeds for a given speed of the engine 12. Thus, the gearsets 20 of the automatic transmission 14 are configured such that the engine 12 can operate at particularly desirable rotational speeds so as to optimize vehicle performance and efficiency. In addition to changing between the gearsets 20, the automatic transmission 14 is also used to modulate engagement with the engine 12, whereby the transmission 14 can selectively control engagement with the engine 12 so as to facilitate vehicle operation. By way of example, torque translation between the engine 12 and the automatic transmission 14 is typically interrupted while the vehicle is parked or idling, or when the transmission 14 changes between the gearsets 20. Modulation of rational torque between the engine 12 and the dual clutch automatic transmission 14 is achieved with one or more hydraulically-actuated clutch assemblies 22 (not shown in detail, but generally known in the art). This configuration is sometimes referred to in the art as a "dual clutch" automatic transmission 14. An example of the dual clutch automatic transmission 14 is disclosed in U.S. Pat. No. 8,375,816 to Braford, Jr., the disclosure of which is hereby incorporated by reference in its entirety. It should be appreciated that the automatic transmission 14 is adapted for use with vehicles such as automotive vehicles, but could be used in connection with any suitable type of vehicle.

Irrespective of the specific configuration of the powertrain system 10, the automatic transmission 14 is typically controlled using hydraulic fluid. Specifically, the automatic transmission 14 is cooled, lubricated, actuated, and modulates torque using hydraulic fluid. To these ends, the automatic transmission 14 typically includes an electronic controller 24 in electrical communication with one or more solenoids 26 (see FIG. 1) used to direct, control, or otherwise regulate flow of fluid throughout the transmission 14, as described in greater detail below. In order to facilitate the flow of hydraulic fluid throughout the automatic transmission 14, the powertrain system 10 includes one or more pumps, generally indicated at 28. In one embodiment, the pump 28 may be a positive displacement pump assembly. It should be appreciated that the pump 28 provides pressurized hydraulic fluid to the solenoid-actuated valves 26.

Figure 2:
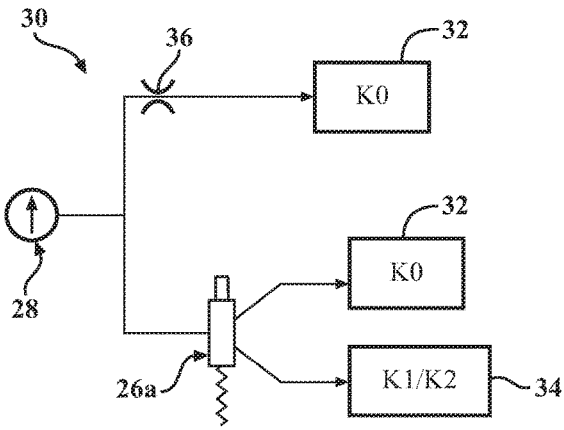
FIG. 2 is a diagrammatic view of one embodiment of the cooling and lubrication system of FIG. 1.

Referring now to FIG. 2, one embodiment of a system such as a cooling and lubrication system, generally indicated at 30 and according to the present invention, is shown for the automatic transmission 14. In this embodiment, the cooling and lubrication system 30 includes at least one pump 28 to pump fluid such as hydraulic fluid. The cooling and lubrication system 30 also includes a 3-way solenoid-actuated valve 26a of the solenoid-actuated valves 26 fluidly connected to the pump 28. The 3-way solenoid-actuated valve 26a is fluidly connected to a first subsystem 32 and a second subsystem 34 of the automatic transmission 14. The cooling and lubrication system 30 further includes a bypass orifice 36 fluidly connected to the pump 28 to bypass fluid around the 3-way solenoid-actuated valve 26a to the first subsystem 32 of the automatic transmission 14.

In one embodiment, the first subsystem 32 includes a disconnect clutch, K0, and a rotor of an electric traction motor of a hybrid transmission (P2 type) and the second subsystem 34 includes two clutches, K1 and K2, of the automatic transmission 14. In one embodiment, the clutches K1 and K2 are wet friction clutches. In the 3-way solenoid-actuated valve 26a, the electronic controller 24 controls variable positioning of a valve against a bias spring by activating and deactivating a solenoid to proportionally change the distribution of flow between the two subsystems 32 and 34. The 3-way solenoid-actuated valve 26a can direct all flow to one subsystem 32, 34 (zero current), the other subsystem 32, 34 (maximum current), or both subsystems 32 and 34 (any current between zero current and maximum current) of the automatic transmission 14. It should be appreciated that an optional parallel flow path around the 3-way solenoid-actuated valve 26a with a fixed bypass orifice 36 may be included to provide a minimum flow to either or both subsystems 32 and 34 of the automatic transmission 14.

Figure 3:
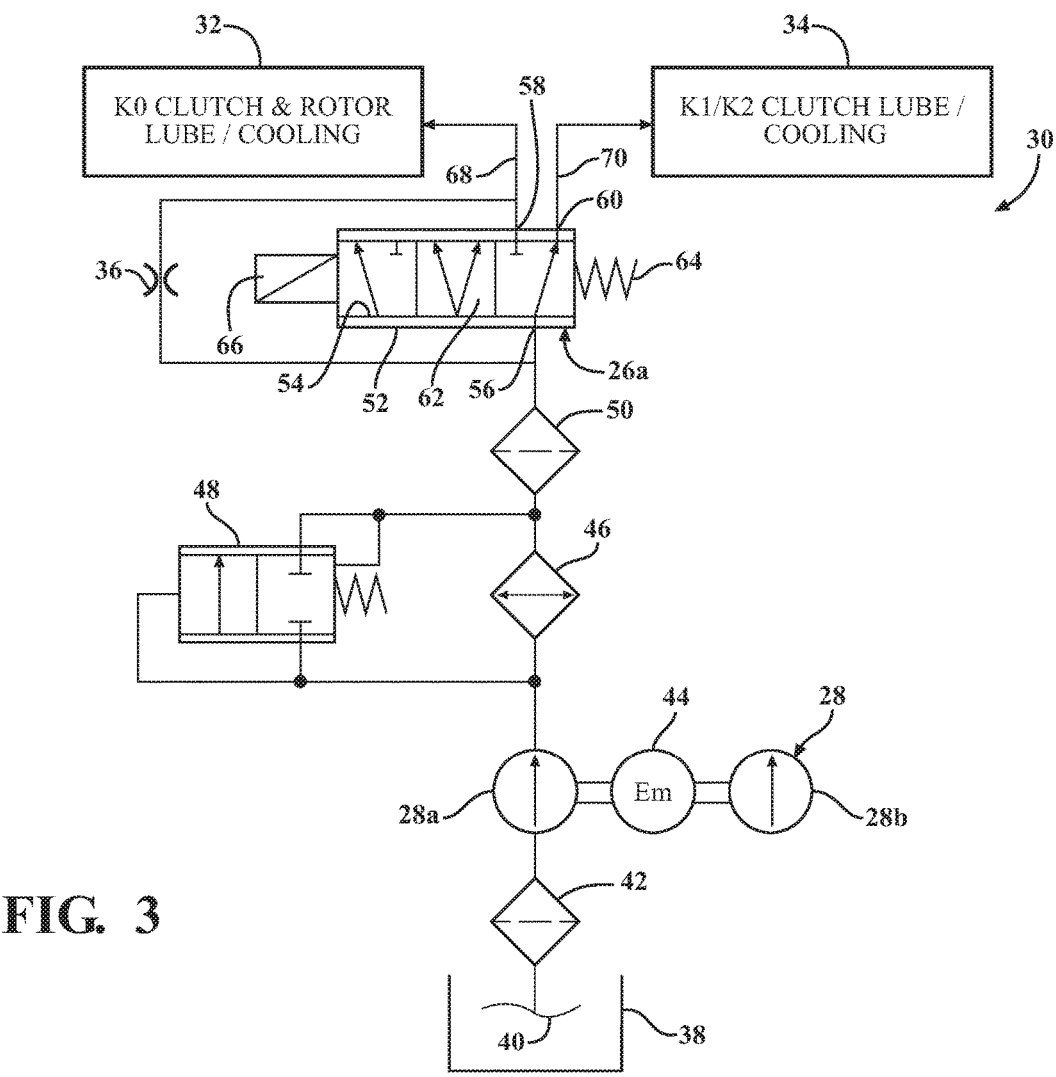
FIG. 3 is a view similar to FIG. 2 illustrating a more detailed embodiment of the cooling and lubrication system of FIG. 1.
Figure 3A:
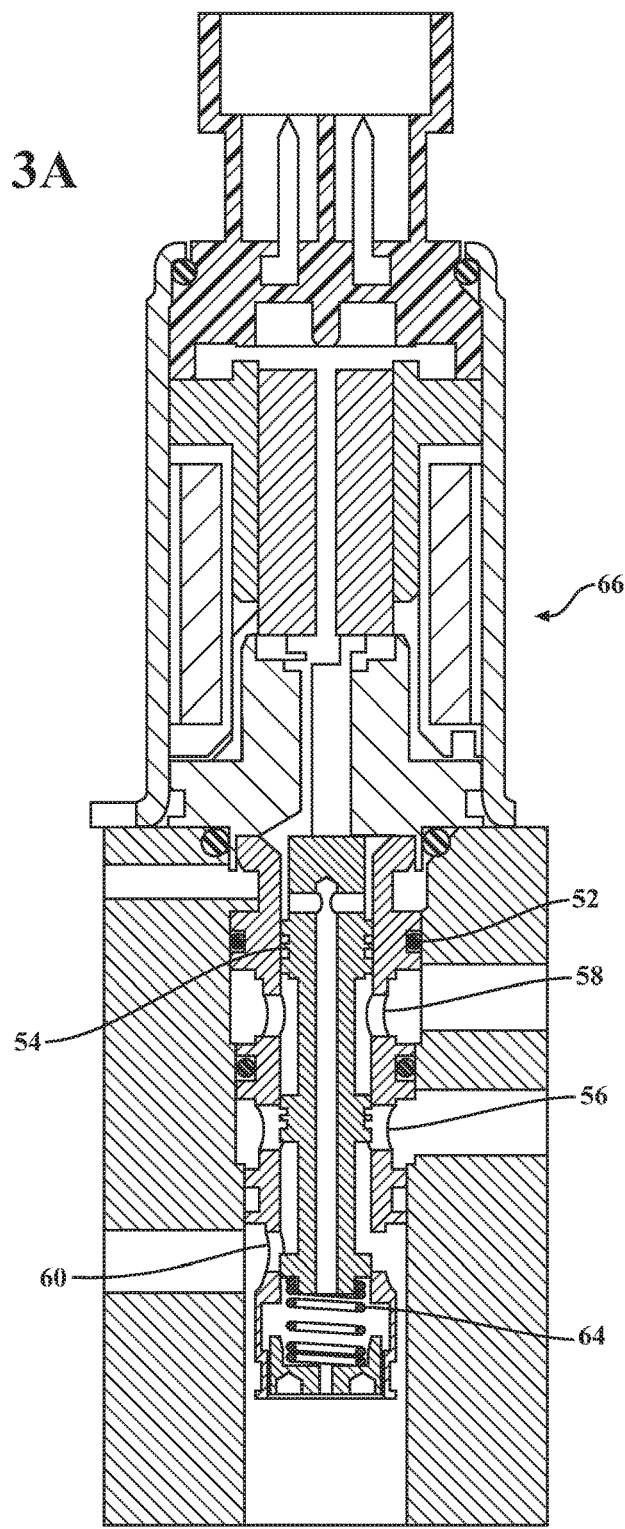
FIG. 3A is a sectional view of a solenoid-actuated valve of the cooling and lubrication system of FIGS. 2 and 3.

Referring to FIG. 3A, a more detailed embodiment of the cooling and lubrication system 30, according to the present invention, is shown for the automatic transmission 14. In this embodiment, the cooling and lubrication system 30 includes a sump 38 that contains fluid 40 such as hydraulic fluid. The cooling and lubrication system 30 also includes a filter 42 fluidly connected to the sump 40 to filter contaminants from the fluid 40. In one embodiment, the filter 42 is a suction filter. The cooling and lubrication system 30 further includes one or more pumps, generally indicated at 28, fluidly connected to the filter 42. In one embodiment, the pumps 28 include a first pump 28a that produces high flow and low pressure and a second pump 28b that produces low flow and high pressure. In one embodiment, the cooling and lubrication system 30 also includes an electric motor (EM) 44 coupled to at least one of the first pump 28a and the second pump 28b such that the at least one of the first pump 28a and the second pump 28b is driven and proportionally controllable by the electric motor 44. It should be appreciated that the electric motor 44 is connected to a source of electrical power such as the electronic controller 24.

The cooling and lubrication system 30 also includes a fluid cooler 46 fluidly connected to the one or more pumps 28 and a cooler bypass valve 48 fluidly connected around the fluid cooler 46 to bypass fluid around the fluid cooler 46 under certain conditions. The cooling and lubrication system 30 further includes a filter 50 fluidly connected to the fluid cooler 46 and to the cooler bypass valve 48 to filter contaminants in the fluid. The cooling and lubrication system 30 also includes the 3-way solenoid-actuated valve 26a fluidly connected to the filter 50 and to the first subsystem 32 and the second subsystem 34 of the automatic transmission 14. The cooling and lubrication system 30 may include the bypass orifice 36 fluidly connected to the filter 50 to bypass fluid around the 3-way solenoid-actuated valve 26a to the first subsystem 32 of the automatic transmission 14.

As illustrated in FIG. 3, in one embodiment, the 3-way lubrication solenoid-actuated valve 26a includes a valve body 52 having a valve bore 54. The valve body 52 also includes multiple ports with one inlet port 56 and a first outlet port 58 and a second outlet port 60 fluidly communicating with the valve bore 54. The 3-way solenoid-actuated valve 26a also includes a valve member or a spool valve 62 (i.e., hydraulic control valve) slideably disposed within the valve bore 54 of the valve body 52. The valve member 62 has a plurality of valve elements (not shown) to proportion flow between the outlet ports 58 and 60 of the valve body 52. The 3-way solenoid-actuated valve 26a further includes a biasing return spring 64 disposed in the valve bore 54 to bias the valve member 62 for flow toward the second outlet port 62. The 3-way solenoid-actuated valve 26a also includes an electronically controlled solenoid, generally indicated at 66, for actuating the valve member 62 to control hydraulic fluid pressure between the inlet port 56 and the outlet ports 58 and 60. It should be appreciated that the solenoid 66 receives a continuous variable, control signal from a primary driver (not shown) such as the electronic controller 24.

The cooling and lubrication system 30 further includes a first fluid circuit 68 fluidly connected to the first outlet port 58 of the 3-way solenoid-actuated valve 26a and the first subsystem 32 for providing cooling fluid to the first subsystem 32. The cooling and lubrication system 30 also includes a second fluid circuit 70 fluidly connected to the second outlet port 60 of the 3-way solenoid-actuated valve 26a and the second subsystem 34 for providing cooling fluid to the second subsystem 34. It should be appreciated that the 3-way solenoid-actuated valve 26a proportions flow of fluid 40 between the first subsystem 32 and the second subsystem 34 of the automatic transmission 14.

In one embodiment, the 3-way solenoid-actuated valve 26a can be arranged so that the centered valve member 62 provides flow to both subsystems 32 and 34 (underlapped valve). The flow characteristic of this arrangement is shown in FIG. 4. As illustrated in FIG. 4, a graph 72 is shown for flow characteristics. The graph 72 includes a Y-axis 74 of fluid flow (liters per minute (Lpm)) and an X-axis 76 for solenoid current (milli-amps (mA)) of the 3-way solenoid-actuated valve 26a. It should be appreciated that, in FIG. 4, the graph 72 includes plots 78 and 80 for a closed-center condition of the 3-way solenoid-actuated valve 26a. It should also be appreciated that a difference 82 in flow between the plots 78 and 80 is due to the fixed flow of the bypass orifice 36.

In another embodiment, the 3-way solenoid-actuated valve 26a can be arranged so that the centered valve member 62 substantially closes off the flow to both subsystems 32 and 34 (overlapped valve). The flow characteristic of this arrangement is shown in FIG. 5. As illustrated in FIG. 5, a graph 72 is shown for flow characteristics. The graph 72 includes a Y-axis 74 of fluid flow (liters per minute (Lpm)) and an X-axis 76 for solenoid current (milli-amps (mA)) of the 3-way solenoid-actuated valve 26a. It should be appreciated that, in FIG. 5, the graph 72 includes plots 78 and 80 for an open-center condition of the 3-way solenoid-actuated valve 26a. It should also be appreciated that a difference 82 in flow between the plots 78 and 80 is due to the fixed flow of the bypass orifice 36.

Figure 6:
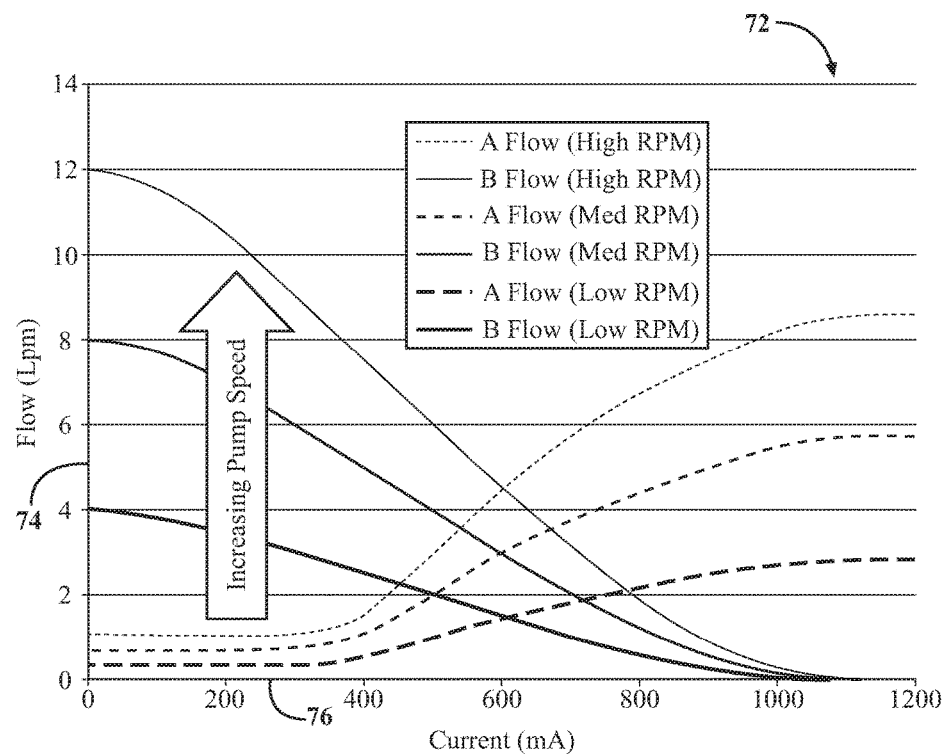
FIG. 6 is yet another graph of flow versus current for the cooling and lubrication system of FIG. 3.

In yet another embodiment, the pump 28 is driven by the electric motor 44 (rather than mechanically driven by the internal combustion engine). In this embodiment, the speed of the electric motor 44 can be modulated along with the current to the solenoid 66 of the 3-way solenoid-actuated valve 26a to provide infinite combinations of lube/cooling flow to the two subsystems 32 and 34 of the automatic transmission 14. FIG. 6 shows a theoretical family of flows based on pump speed and solenoid current. As illustrated in FIG. 6, a graph 72 is shown of example flow distribution showing global increase in flow as pump RPM or speed increases and flow distribution bias as solenoid current changes of the 3-way solenoid-actuated valve 26a. The graph 72 includes a Y-axis 74 of fluid flow (liters per minute (Lpm)) and an X-axis 76 for solenoid current (milli-amps (mA)) of the 3-way solenoid-actuated valve 26a. It should be appreciated that, in FIG. 6, the graph 72 includes plots of A flow (high RPM), B flow (high RPM), A flow (medium RPM), B flow (medium RPM), A flow (low RPM), and B flow (low RPM) of the 3-way solenoid-actuated valve 26a. It should be appreciated that the plots move up and down the graph 72 as the pump RPM or speed increases or decreases, respectively.

In still another embodiment (underlapped spool and electric motor driven pump) and application (P2 hybrid transmission), it is possible and relatively simple to fully control lube/cooling flow to the launch clutch of the first subsystem 32 and the electric traction motor of the second subsystem 34. It should be appreciated that this is a smaller, simpler, and more elegant solution than other solutions previously carried out.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the invention may be practiced other than as specifically described.

What is claimed is:

1. A system for use in an automatic transmission, said system comprising:
   a 3-way solenoid-actuated valve comprising:
     a valve body having an inlet port and a first outlet port and a second outlet port;
     a valve disposed within said valve body and slidably controllable to proportion flow between said first outlet port and said second outlet port; and
     a spring disposed in said valve body to bias said valve for flow toward said second outlet port;
   at least one pump providing fluid to said inlet port;
   a bypass orifice to bypass a fixed flow of fluid around said 3-way solenoid-actuated valve to a first subsystem of the automatic transmission;
   a first fluid circuit connected to said first outlet port providing fluid to the first subsystem of the automatic transmission; and
   a second fluid circuit connected to said second outlet port providing fluid to a second subsystem of the automatic transmission.

2. A system as set forth in claim 1 wherein at least one of said first subsystem and said second subsystem includes at least one wet friction clutch.

3. A system as set forth in claim 1 wherein said at least one pump is driven and proportionally controllable by an electric motor.

4. A system as set forth in claim 1 wherein one of said first subsystem and said second subsystem includes an electric traction motor.

5. A system as set forth in claim 1 wherein said first subsystem includes at least one wet friction clutch and said at least one pump is driven and proportionally controllable by an electric motor.

6. A system as set forth in claim 1 wherein said first subsystem includes an electric traction motor and said second subsystem includes at least one wet friction clutch.

7. A system as set forth in claim 1 wherein said at least one pump is driven and proportionally controllable by an electric motor and said first subsystem includes an electric traction motor.

8. A system as set forth in claim 1 wherein said at least one pump is driven and proportionally controllable by an electric motor, said first subsystem includes an electric traction motor, and said second subsystem includes at least one wet friction clutch.

9. A cooling and lubrication system for use in an automatic transmission, said cooling and lubrication system comprising:
    a 3-way solenoid-actuated valve comprising:
        a valve body having an inlet port and a first outlet port and a second outlet port;
        a valve disposed within said valve body and slidably controllable to proportion flow between said first outlet port and said second outlet port; and
        a spring disposed in said valve body to bias said valve for flow toward said second outlet port;
    at least one pump driven and proportionally controllable by an electric motor providing fluid to said inlet port;
    a first fluid circuit connected to said first outlet port providing cooling fluid to a first subsystem of the automatic transmission;
    a second fluid circuit connected to said second outlet port providing cooling fluid to a second subsystem of the automatic transmission; and
    a bypass orifice to bypass a fixed flow of fluid around said 3-way solenoid-actuated valve to the first subsystem of the automatic transmission.

10. A cooling and lubrication system as set forth in claim 9 wherein at least one of said first subsystem and said second subsystem includes at least one wet friction clutch.

11. A cooling and lubrication system as set forth in claim 9 wherein one of said first subsystem and said second subsystem includes an electric traction motor.

12. A cooling and lubrication system as set forth in claim 9 wherein said first subsystem includes an electric traction motor and said second subsystem includes at least one wet friction clutch.

13. An automatic transmission comprising:
    a first subsystem;
    a second subsystem;
    a 3-way solenoid-actuated valve comprising:
        a valve body having an inlet port and a first outlet port and a second outlet port;
        a valve disposed within said valve body and slidably controllable to proportion flow between said first outlet port and said second outlet port; and
        a spring disposed in said valve body to bias said valve for flow toward said second outlet port;
    at least one pump providing fluid to said inlet port;
    a bypass orifice to bypass a fixed flow of fluid around said solenoid-actuated valve to said first subsystem;
    a first fluid circuit connected to said first outlet port providing fluid to said first subsystem; and
    a second fluid circuit connected to said second outlet port providing fluid to said second subsystem.

14. An automatic transmission as set forth in claim 13 wherein said first subsystem includes an electric traction motor and said second subsystem includes at least one wet friction clutch.

15. A system for use in an automatic transmission, said system comprising:
    a 3-way solenoid-actuated valve comprising:
        a valve body having an inlet port and a first outlet port and a second outlet port;
        a valve disposed within said valve body and slidably controllable to proportion flow between said first outlet port and said second outlet port; and
        a spring disposed in said valve body to bias said valve for flow toward said second outlet port;
    at least one pump providing fluid to said inlet port;
    a first fluid circuit connected to said first outlet port providing fluid to a first subsystem of the automatic transmission; and
    a second fluid circuit connected to said second outlet port providing fluid to a second subsystem of the automatic transmission,
    wherein said 3-way solenoid-actuated valve provides cooling and lubrication to said first subsystem and said second subsystem.

16. A system for use in an automatic transmission, said system comprising:
    a 3-way solenoid-actuated valve comprising:
        a valve body having an inlet port and a first outlet port and a second outlet port;
        a valve disposed within said valve body and slidably controllable to proportion flow between said first outlet port and said second outlet port, wherein the valve is suitable to direct fluid to both said first outlet port and said second outlet port at the same time; and
        a spring disposed in said valve body to bias said valve for flow toward said second outlet port;
    at least one pump providing the fluid to said inlet port;
    a first fluid circuit connected to said first outlet port providing fluid to a first subsystem; and
    a second fluid circuit connected to said second outlet port providing fluid to a second subsystem of the automatic transmission.

* * * * *